US011250853B2

(12) United States Patent
Zhou et al.

(10) Patent No.: US 11,250,853 B2
(45) Date of Patent: Feb. 15, 2022

(54) SARCASM-SENSITIVE SPOKEN DIALOG SYSTEM (71) Applicant: Robert Bosch GmbH, Stuttgart (DE)

(72) Inventors: Zhengyu Zhou, Fremont, CA (US); In Gyu Choi, Atlanta, GA (US)

(73) Assignee: ROBERT BOSCH GMBH, Stuttgart (DE)

( * ) Notice: Subject to any disclaimer, the term of this patent is extended or adjusted under 35 U.S.C. 154(b) by 97 days.

(21) Appl. No.: 16/862,620

(22) Filed: Apr. 30, 2020

(65) Prior Publication Data
US 2021/0343280 A1 Nov. 4, 2021

(51) Int. Cl.
G10L 15/22 (2006.01)
G10L 15/16 (2006.01)
G10L 15/08 (2006.01)
G10L 15/05 (2013.01)
G10L 15/06 (2013.01)
G10L 15/02 (2006.01)

(52) U.S. Cl.
CPC .............. G10L 15/22 (2013.01); G10L 15/02 (2013.01); G10L 15/05 (2013.01); G10L 15/063 (2013.01); G10L 15/083 (2013.01); G10L 15/16 (2013.01); G10L 2015/227 (2013.01)

(58) Field of Classification Search
CPC ......... G10L 15/22; G10L 15/02; G10L 15/05; G10L 15/063; G10L 15/083; G10L 2015/227; G06F 40/56; G06F 40/44; G06F 40/48

USPC ......................................................... 704/275
See application file for complete search history.

(56) References Cited

U.S. PATENT DOCUMENTS

| 9,836,452 | B2 | 12/2017 | Robichaud et al. |
| 10,438,586 | B2 | 10/2019 | Ikeno et al. |
| 10,770,063 | B2 * | 9/2020 | Jin ........................... G10L 13/02 |
| 10,803,055 | B2 * | 10/2020 | Sirotkovic .......... G06F 16/2425 |
| 2019/0371302 | A1 | 12/2019 | Watanabe et al. |
| 2020/0265196 | A1 * | 8/2020 | Ravi ..................... G06K 9/6232 |

OTHER PUBLICATIONS

Gu et al., "Dialogwae: Multimodal Response Generation With Conditional Wasserstein Auto-Encoder", Published as a conference paper at ICLR 2019, arXiv:1805.12352v2, Feb. 26, 2019, 11 pages.
Khodak et al., "A Large Self-Annotated Corpus for Sarcasm", Computer Science Department, Princeton University, arXiv:1704.05579v4, Mar. 22, 2018, 6 pages.
Pennington et al., "GloVe: Global Vectors for Word Representation", Computer Science Department, Stanford University, 12 pages.

(Continued)

Primary Examiner — Susan I McFadden
(74) Attorney, Agent, or Firm — Dickinson Wright PLLC (57) ABSTRACT A dialog system and a method of using the dialog system is disclosed. The method may comprise: receiving audible human speech from a user; determining that the audible human speech comprises sarcasm information; providing an input to a neural network, wherein the input comprises speech data input associated with the audible human speech, an embedding vector associated with the sarcasm information, and a one-hot vector; and based on the input, determining an audible response to the human speech.

20 Claims, 8 Drawing Sheets (56) References Cited

OTHER PUBLICATIONS

Jurafsky, D. and Martin, J.H., 2009. Speech and language processing: An introduction to natural language processing, computational linguistics, and speech recognition. Prentice Hall series in artificial intelligence, pp. 1-1024, 18 pages.
Devlln, J., Chang, M.W., Lee, K. and Toutanova, K., 2018. Bert: Pre-training of deep bidirectional transformers for language understanding. arXiv preprintarXiv: 1810.04805, 16 pages.
Akbik, A., Blythe, D. and Vollgraf, R., 2018, August. Contextual string embeddings for sequence labeling. In Proceedings of the 27th International Conference on Computational Linguistics (pp. 1638-1649), 12 pages.
Frazier, L., Carlson, K. and Clifton Jr, C., 2006. Prosodic phrasing is central to language comprehension. Trends in cognitive sciences, 10(6), pp. 244-249, 7 pages.
Rakov, R. and Rosenberg, A., Aug. 2013. "Sure, I did the right thing": a system for sarcasm detection in speech. In Interspeech (pp. 842-846), 5 pages.
Wang, D. and Narayanan, S., 2007. An acoustic measure for word prominence in spontaneous speech. IEEE transactions on audio, speech, and language processing, 15(2), pp. 690-701, 12 pages.
Audhkhasi, K., Kandhway, K., Deshmukh, O.D. and Verma, A., Apr. 2009. Formant-based technique for automatic filled-pause detection in spontaneous spoken English. In 2009 IEEE International Conference on Acoustics, Speech and Signal Processing (pp. 4857-4860). IEEE, 4 pages.

\* cited by examiner

SARCASM-SENSITIVE SPOKEN DIALOG SYSTEM

TECHNICAL FIELD

The present disclosure relates to computational methods and computer systems for generating a response to a human speech input.

BACKGROUND

Spoken dialog systems can enable a computer, when presented with a human speech input, optionally together with the previous human-computer interaction history, to provide a response. However, such spoken dialog systems are typically ill-equipped to receive a sarcastic human communication and respond appropriately.

SUMMARY

According to one embodiment, a method of using a dialog system is disclosed. The method may comprise: receiving audible human speech from a user; determining that the audible human speech comprises sarcasm information; providing an input to a neural network, wherein the input comprises speech data input associated with the audible human speech, an embedding vector associated with the sarcasm information, and a one-hot vector; and based on the input, determining an audible response to the human speech.

According to another embodiment, a non-transitory computer-readable medium comprising computer-executable instructions and memory for maintaining the computer-executable instructions is disclosed. The computer-executable instructions when executed by one or more processors of a computer may perform the following functions: receive audible human speech from a user; determine that the audible human speech comprises sarcasm information; provide an input to a neural network, wherein the input comprises speech data input associated with the audible human speech, an embedding vector associated with the sarcasm information, and a one-hot vector; and based on the input, determine an audible response to the human speech.

According to another embodiment, a sarcasm-sensitive spoken dialog system is disclosed. The dialog system may comprise: one or more processors; and memory coupled to the one or more processors, wherein the memory stores a plurality of instructions executable by the one or more processors. The plurality of instructions may comprise, to: receive audible human speech from a user; determine that the audible human speech comprises sarcasm information; provide an input to a neural network, wherein the input comprises speech data input associated with the audible human speech, an embedding vector associated with the sarcasm information, and a one-hot vector; and based on the input, determine an audible response to the human speech.

According to the at least one example set forth above, a computing device comprising at least one processor and memory is disclosed that is programmed to execute any combination of the examples of the method(s) set forth herein.

According to the at least one example, a computer program product is disclosed that includes a computer readable medium that stores instructions which are executable by a computer processor, wherein the instructions of the computer program product include any combination of the examples of the method(s) set forth herein and/or any combination of the instructions executable by the one or more processors, as set forth herein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Turning now to the figures (e.g., FIG. 1), wherein like reference numerals indicate similar or identical features or functions, a sarcasm-sensitive spoken dialog system 10 is shown embodied in a table-top device 12 that—using a neural network 14—generates a speech response that accounts for sarcasm based on receiving audible human speech (e.g., from a user (not shown)) who speaks (e.g., to the dialog system 10) using sarcasm. When present in a user's speech, sarcasm may add sharpness, irony, and/or satire; sarcasm may be witty, bitter, or the like and may or may not be directed at an individual or other speaker. Further, in some instances, sarcasm may infer that the user means the opposite of what he/she has uttered. Such instances may be difficult for computerized dialog systems to appropriately respond. For example, if the user is posed the question: How are you doing today? The user could respond by stating: I'm having a great day when, in fact, the user sarcastically means he is not having a great day. Further, the user may become irritated if a computerized dialog system replies: I'm glad to hear you're having a great day! Instead, it is desirable that the dialog system detects the sarcasm (in I'm having a great day) and provides an appropriate response, such as: Oh, I'm sorry. What's wrong? The dialog system 10 is configured to improve computer response to user sarcasm.

Figure 1:
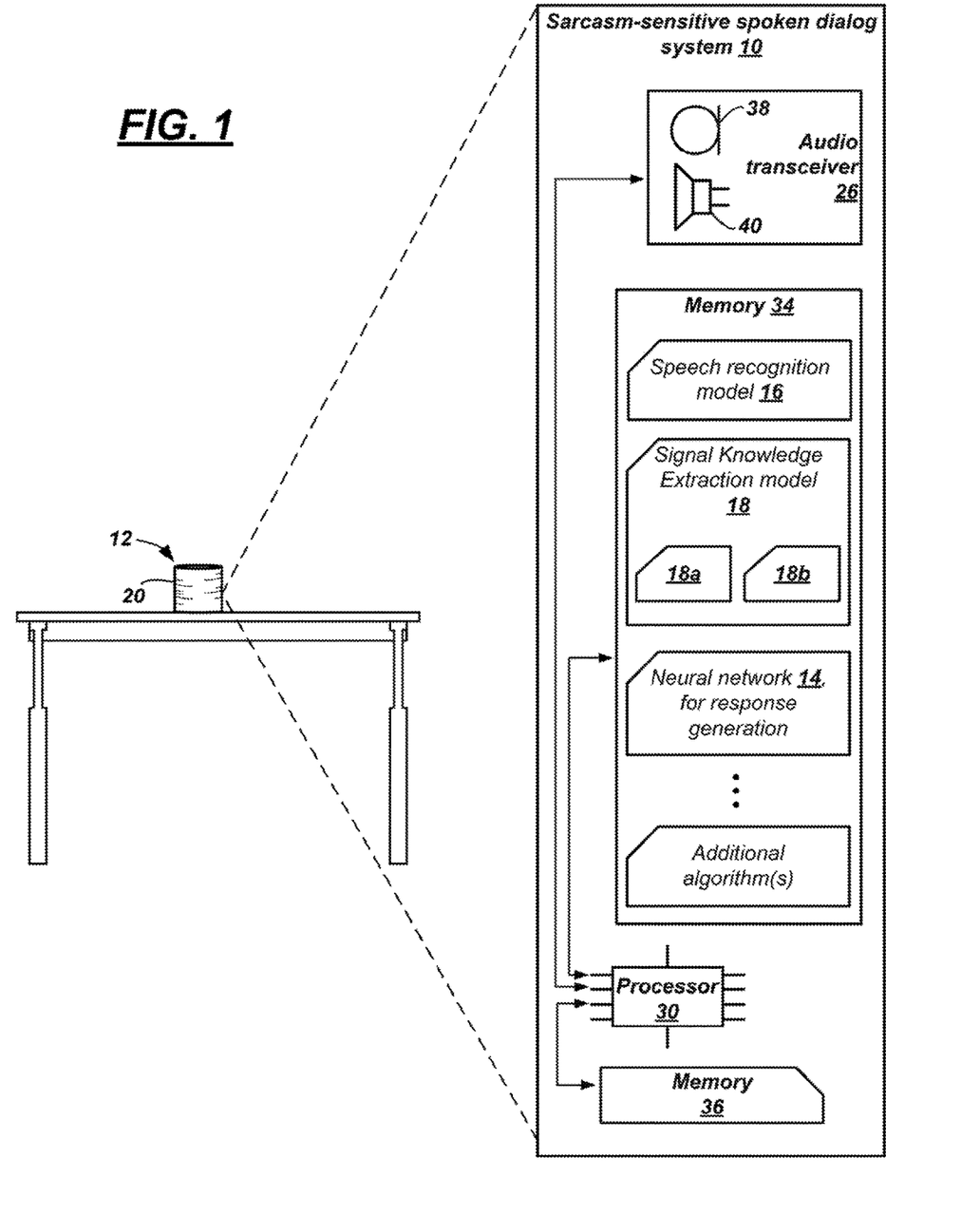
FIG. 1 is a schematic diagram illustrating a sarcasm-sensitive spoken dialog system embodied in a table-top device.

As described in greater detail below, dialog system 10 also may comprise a speech recognition model 16 that recognizes and interprets a plain-language meaning of a user's utterance and a signal knowledge extraction model 18 that determines whether sarcasm is present in the utterance. The neural network 14 may be trained to provide a response to the user based on a neural network input that includes an output from the speech recognition model 16. Further, based on a detection of sarcasm by signal knowledge extraction model 18, the input to neural network 14 further may comprise at least one embedding vector and a one-hot vector. By using both vectors, dialog system 10 may generate a more accurate response to a user utterance comprising sarcasm. Further, in at least some examples, the dialog system 10 may generate the more accurate response which further comprises sarcasm as well (e.g., so that the user may appreciate a wittiness of the dialog system 10).

Table-top device 12 may comprise a housing 20 and the dialog system 10 may be carried by the housing 20. Housing 20 may be any suitable enclosure, which may or may not be sealed. And the term housing should be construed broadly. Table-top device 12 may be suitable for resting atop tables, shelves, or on floors and/or for attaching to walls, underneath counters, or ceilings, etc. according to any suitable orientation.

Sarcasm-sensitive spoken dialog system 10 may comprise an audio transceiver 26, one or more processors 30 (only one is shown), any suitable quantity and arrangement of non-volatile memory 34, and/or any suitable quantity and arrangement of volatile memory 36. Accordingly, dialog system 10 comprises at least one computer (e.g., embodied as at least one of the processors 30 and memory 34, 36), wherein the dialog system 10 is configured to carry out the methods described herein. Each of the audio transceiver 26, processor(s) 30, memory 34, and memory 36 will be described in turn Audio transceiver 26 may comprise one or more microphones 38 (only one is shown), one or more loudspeakers 40 (only one is shown), and one or more electronic circuits (not shown) coupled to the microphone(s) 38 and/or loudspeaker(s) 40. The electronic circuit(s) may comprise an amplifier (e.g., to amplify an incoming and/or outgoing analog signal), a noise reduction circuit, an analog-to-digital converter (ADC), a digital-to-analog converter (DAC), and the like. Audio transceiver 26 may be coupled communicatively to the processor(s) 30 so that audible human speech may be received into the dialog system 10 and so that a generated response may be provided audibly to the user once the dialog system 10 has processed the user's speech.

Processor(s) 30 may be programmed to process and/or execute digital instructions to carry out at least some of the tasks described herein. Non-limiting examples of processor(s) 30 include one or more of a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc.—just to name a few. In at least one example, processor(s) 30 read from non-volatile memory 34 and/or memory 36 and/or and execute multiple sets of instructions which may be embodied as a computer program product stored on a non-transitory computer-readable storage medium (e.g., such as non-volatile memory 34). Some non-limiting examples of instructions are described in the process(es) below and illustrated in the drawings. These and other instructions may be executed in any suitable sequence unless otherwise stated. The instructions and the example processes described below are merely embodiments and are not intended to be limiting.

Non-volatile memory 34 may comprise any non-transitory computer-usable or computer-readable medium, storage device, storage article, or the like that comprises persistent memory (e.g., not volatile). Non-limiting examples of non-volatile memory 34 include: read-only memory (ROM), erasable programmable read-only memory (EPROM), electrically erasable programmable read-only memory (EEPROM), optical disks, magnetic disks (e.g., such as hard disk drives, floppy disks, magnetic tape, etc.), solid-state memory (e.g., floating-gate metal-oxide semiconductor field-effect transistors (MOSFETs), flash memory (e.g., NAND flash, solid-state drives, etc.), and even some types of random-access memory (RAM) (e.g., such as ferroelectric RAM). According to one example, non-volatile memory 34 may store one or more sets of instructions which may be embodied as software, firmware, or other suitable programming instructions executable by the processor(s) 30—including but not limited to the instruction examples set forth herein. For example, according to an embodiment, non-volatile memory 34 may store the neural network 14, the speech recognition model 16, and the signal knowledge extraction model 18, among one or more additional algorithms (e.g., also called models, programs, etc.).

Volatile memory 36 may comprise any non-transitory computer-usable or computer-readable medium, storage device, storage article, or the like that comprises nonpersistent memory (e.g., it may require power to maintain stored information). Non-limiting examples of volatile memory 36 include: general-purpose random-access memory (RAM), static RAM (SRAM), dynamic RAM (DRAM), or the like.

Herein, the term memory may refer to either non-volatile or volatile memory, unless otherwise stated. During operation, processor(s) 30 may read data from and/or write data to memory 34 or 36.

Figure 2:
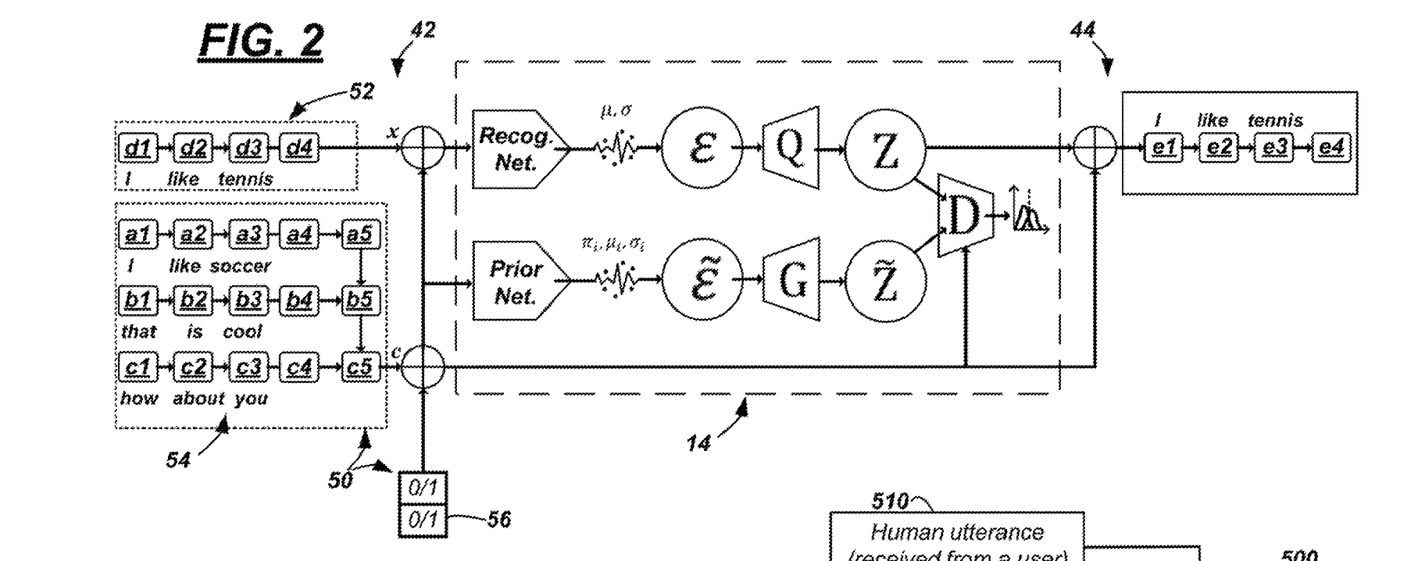
FIG. 2 is a schematic diagram illustrating an example neural network that may be used in the dialog system, input(s) to the neural network, and an output of the neural network.

FIG. 2 illustrates an embodiment of neural network 14. According to an embodiment, neural network 14 may be an end-to-end neural network. For example, neural network 14 may be a conditional Wasserstein autoencoder (WAE), comprising an input 42 that feeds into a recognition network (recog. net.) and a prior network (prior net.). An output of the recognition network may be transferred into a Gaussian distribution with a mean ($\mu$) and diagonal deviation ($\sigma$), from which a context-dependent random noise ($\varepsilon$) is drawn. A generator (Q) then generates an approximate posterior sample (Z) based on the noise (ε). Similarly, an output of the prior network may be transferred into a mixture of Gaussian distributions, with the $i^{th}$ distribution having a mean ($\mu_i$), a diagonal covariance ($\sigma_i$), and a weight ($\pi_i$). A context-dependent random noise ($\tilde{\varepsilon}$) is drawn from the Gaussian mixture, and a generator (G) then generates a prior sample ($\tilde{Z}$) based on the noise ($\tilde{\varepsilon}$) Thereafter, the Z and the $\tilde{Z}$ are provided to a response decoder which yields an output 44 of the neural network 14. The Z and the $\tilde{Z}$ are also provided to an adversarial discriminator (D) which distinguish between the prior samples and posterior samples at the training time. One non-limiting example of the neural network 14 may be the DialogWAE, as discussed in "DialogWAE: Multimodal Response Generation with Conditional Wasserstein Auto-Encoder," by Xiaodong Gu, Kyunghyun Cho, Jung-Woo Ha, and Sunghun Kim. Other examples of neural network 14 also exist.

Speech recognition model 16 (shown in FIG. 1) may be any suitable set of instructions that processes audible human speech; according to an example, speech recognition model 16 also converts the human speech into recognizable and/or interpretable words (e.g., text). A non-limiting example of the speech recognition model 16 is a model comprising an acoustic model, a pronunciation model, and a language model—e.g., wherein the acoustic model maps audio segments into phonemes, wherein the pronunciation model connects the phonemes together to form words, and wherein the language model expresses a likelihood of a given phrase. Continuing with the present example, speech recognition model 16 may, among other things, receive human speech via microphone(s) 38 and determine the uttered words and their context. However, in at least one example, the speech recognition model 16 may not identify sarcasm.

Signal knowledge extraction model 18 (shown in FIG. 1) may be any suitable set of instructions that identifies sarcasm information using raw audio (e.g., from the microphone 38) and/or the output of the speech recognition model 16. Sarcasm information may comprise one or more of a prosodic cue, a spectral cue, or a contextual cue, wherein the prosodic cue comprises one or more of an accent feature, a stress feature, a rhythm feature, a tone feature, a pitch feature, and an intonation feature, wherein the spectral cue comprises any waveform outside of a range of frequencies assigned to an audio signal of a user's speech (e.g., spectral cues can be disassembled into its spectral components by Fourier analysis or Fourier transformation), wherein the contextual cue comprises an indication of speech context (e.g., circumstances around an event, statement, or idea expressed in human speech which provides additional meaning). When the signal knowledge extraction model 18 determines that sarcasm information exists in the human utterance, it may indicate to the processor(s) 30 to append an embedding vector to speech data input (i.e., input to the neural network 14) and may assign a first dimension of a one-hot vector to be a one (1) indicating a determination of sarcasm information. When the signal knowledge extraction model 18 determines that sarcasm information does not exist in a human utterance, it may indicate to the processor(s) 30 to not append an embedding vector to speech data input (i.e., input to the neural network 14) and may assign a first dimension of a one-hot vector to be a zero (0) indicating an absence of sarcasm information.

According to one non-limiting example, the signal knowledge extraction model may be embodied as a text-based sentiment analysis tool 18a and a signal-based sentiment analysis tool 18b (see again FIG. 1). Each will be discussed in turn.

Text-based (TB) sentiment analysis tool 18a may be any software program, algorithm, or model which receives as input a word sequence (e.g., textual speech data from the speech recognition model 16) and classifies the word sequence according to a human emotion (or sentiment). While not required, the text-based sentiment analysis tool 18a may use machine learning (e.g., such as a Python™ product) to achieve this classification. The resolution of the classification may be Positive, Neutral, or Negative in some examples; in other examples, the resolution may be binary (Positive or Negative), or tool 18a may have increased resolution, e.g., such as: Very Positive, Positive, Neutral, Negative, and Very Negative (or the like). One non-limiting example is Python's™ NLTK Text Classification; however, this is merely an example, and other examples exist.

Signal-based (SB) sentiment analysis tool 18b may be any software program, algorithm, or model which receives as input acoustic characteristics derived from the signal speech data (e.g., from the signal knowledge extraction model 18) and classifies the acoustic characteristics according to a human emotion (or sentiment). While not required, the signal-based sentiment analysis tool 18b may use machine learning (e.g., such as a Python™ product) to achieve this classification. The resolution of the classification may be Positive, Neutral, or Negative in some examples; in others, the resolution may be binary (Positive or Negative), or tool 18b may have increased resolution, e.g., such as: Very Positive, Positive, Neutral, Negative, and Very Negative (or the like). One non-limiting example is the Watson Tone Analyzer by IBM™; this is merely an example, and other examples exist.

It will be appreciated that computer programs, algorithms, models, or the like may be embodied in any suitable instruction arrangement. E.g., one or more of the speech recognition model 16, the signal knowledge extraction model 18, the text-based sentiment analysis tool 18a, the signal-based sentiment analysis tool 18b, and any other additional suitable programs, algorithms, or models may be arranged as a single software program, multiple software programs capable of interacting and exchanging data with one another via processor(s) 30, etc. Further, any combination of the above programs, algorithms, or models may be stored wholly or in part on memory 34, memory 36, or a combination thereof.

Figure 3:
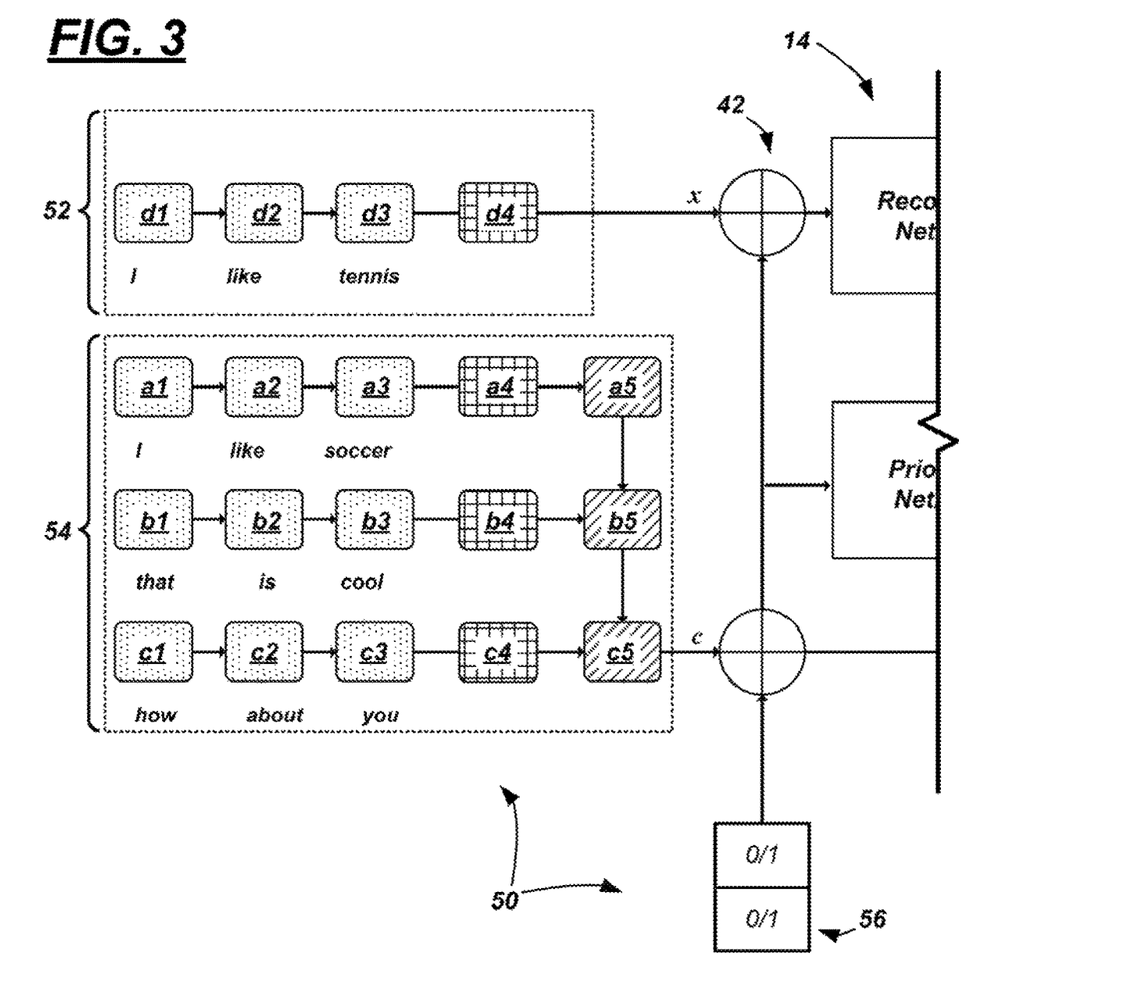
FIG. 3 is an enlargement of the input(s) to the neural network shown in FIG. 2.

In FIGS. 2-3, the input 42 comprises a first portion 50 and a second portion 52. The first portion 50 may comprise an output of a word embedding layer (word embedding vectors a1-a3, b1-b3, c1-c3), a sarcasm embedding vector (e.g., a4, b4, c4) appended to the respective outputs of the word embedding layer, and respective outputs of an utterance encoder (a5, b5, c5). A word embedding layer may refer to word representations that enable words with similar meanings to have similar representations. In the illustrated example, first portion 50 comprises a dialog history 54—here, the dialog history 54 comprises in chronological order comprising a first human utterance ("I like soccer," e.g., a1+a2+a3), a previous response of the neural network 14 to the first human utterance ("that is cool," e.g., b1+b2+b3)), and a second human utterance ("how about you," e.g., c1+c2+c3) in response to the previous response of the neural network 14.

Each of the first human utterance, the previous response of the neural network 14, and the second human utterance may be appended with a sarcasm embedding vector (e.g., also called a sarcasm token) (e.g., a4, b4, c4, respectively). Herein, the term 'appended' should be construed broadly; e.g., to append the sarcasm embedding vector may refer to attaching or coupling the embedding vector to a beginning of an utterance, to an end of an utterance, or to somewhere in between the beginning and end thereof. The embedding vector may provide information regarding a richer meaning of a sentence (e.g., including a semantic meaning of a sentence). The embedding vectors may be appended when the signal knowledge extraction model 18 determines sarcasm information. When no sarcasm information is detected by model 18, then a zero vector (or no vector) may be appended instead.

Each of the first human utterance, the previous response of the neural network 14, and the second human utterance may include the outputs of an utterance encoder (e.g., utterance representation vectors a5, b5, c5, respectively). The utterance encoder may be a recurrent neural network whose input is the sequence of embedding vectors in a sentence (e.g., a1, a2, a3, and a4) and output is a representation vector (e.g., a5) of that sentence. Optimally, the conversation floor of each sentence in the conversation history (1 if the sentence is a human utterance, otherwise 0) may also be appended to the utterance representation vector of the sentence in focus as one additional dimension. The utterance representation vectors (i.e., a5, b5, c5) are then fed into another recurrent neural network to generate a context vector c, which is an overall representation of all the sentences in the conversation history. The context vector c may be used by the neural network 14 to better interpret the dialog history 54 and provide an appropriate and accurate response.

As discussed above, input 42 further may comprise including a one-hot vector 56. For example, the context vector c that represents dialog history 54, and the one-hot vector 56 may be input to the neural network 14 via a concatenation operation (i.e., connect the two vectors together into one vector, wherein the operation is represented as a circle with a plus sign therein). The one-hot vector 56 may comprise one or more dimensions (e.g., a first dimension, a second dimension, a third dimension, etc.). For each dimension, the dimension's value may be zero (0) or one (1). According to an embodiment, a zero (0) may signify the absence of sarcasm in the sentence, and a one (1) may signify sarcasm is present in the sentence. According to an embodiment, a first dimension of the one-hot vector 56 may indicate whether the signal knowledge extraction model 18 determines that a respective human utterance comprises sarcasm information (0 meaning no sarcasm information is present and 1 meaning sarcasm information is present). According to at least one embodiment, a second (or other) dimension of the one-hot vector 56 may indicate whether sarcasm (or sarcasm information) should be added to the response generated by the neural network 14. According to at least one embodiment, at least one dimension of the one-hot vector 56 may indicate whether a previous word sequence of the dialog history 54 comprises sarcasm (e.g., two previous word sequences are shown in FIG. 2 (a1-a3 and b1-b3), and each could be associated with a different dimension of the one-hot vector 56).

According to yet another example, the dimensions of the one-hot vector 56 may be predetermined and used in training data (e.g., rather than be determined by the signal knowledge extraction model 18). For example, to train the neural network 14, a suitable quantity of sentences may be passed through the neural network 14 using the training data, wherein the sentences are a predetermined dialog, wherein each sentence has either a sarcasm token or no sarcasm token (which shows whether the sentence is sarcastic) appended thereto, wherein the first dimension of the one-hot vector is predetermined and wherein the value of the first dimension corresponds with the sarcasm information (presented as a sarcasm token or its absence) of the predetermined most recent dialog sentence (i.e., the one that represents the most recent human utterance in dialog context). The second dimension of the one-hot vector may correspond to the sarcasm information of the response to be generated. In a training mode, the second dimension of the one-hot vector is predetermined and the value of the second dimension corresponds with the sarcasm information of a predetermined target response in the training data. If the response is sarcastic (i.e., with a sarcasm token associated with it), the second dimension of the one-hot vector is set as 1. Otherwise, it is set as 0. In an inference (or application) mode, the second dimension of the one-hot vector is a configurable parameter of the dialog system 10. Should it be desirable that the response is not sarcastic, a non-sarcastic response may be preconfigured by programming the second dimension of the one-hot vector to be a zero (0). In case that a sarcastic response is desirable, a sarcastic response may be preconfigured by programming the second dimension of the one-hot vector to be a one (1). According to a non-limiting example, the sarcasm embedding vector (e.g., a4, b4, c4, d4 in FIGS. 2 and 3) may be initialized as a GloVe word embedding for the word 'not' (wherein GloVe refers to Global Vectors for word representation); however, other word embedding examples may be used instead. By using the sarcasm token (which represents the occurrence of sarcasm for the focused utterance) as one additional input of the word embedding layer, the sarcasm embedding vector may be trained or fine-tuned in the same way as other word embedding vectors.

Turning to the second portion 52 shown in FIG. 2, second portion 52 may be only used during training of the neural network 14. As will be described more below, second portion 52 may comprises a duplication of a target response (e.g., see output 44) of the neural network 14. In the illustrated example, the second portion 52 comprises an output of a word embedding layer (word embedding vectors d1, d2, d3) for the words in the target response and a sarcasm embedding vector (d4) indicating whether the target response includes sarcasm information or not. The embedding vectors (d1, d2, d3, d4) are then fed into an utterance encoder (a recurrent neural network), which outputs a vector x as the hidden presentation of the whole target response. As shown in FIG. 2, the vector x is then fed into the neural network 14 via a concatenation operation (i.e., merge this vector with other input vector into one vector). When the dialog system 10 is not in the training mode, second portion 52 may not be used (e.g., may be omitted).

Figure 4:
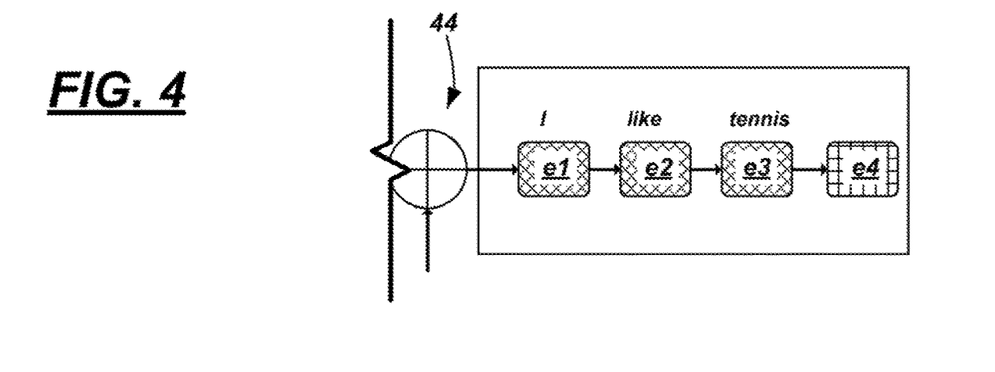
FIG. 4 is an enlargement of the output of the neural network shown in FIG. 2.

As shown in FIGS. 2 and 4, the output 44 of the neural network 14 may comprise a generated response (e.g., a sequence of word/sarcasm tokens). Here, the output 44 is generated by a response decoder based on the hidden representation produced by neural network 14. The output 14 includes a sequence of word tokens (e1, e2, e3). It also includes a sarcasm token (e4) if the generated response is deemed sarcastic. E.g., here, the output sentence "I like tennis," (e1+e2+e3) may not include a sarcasm token (i.e., e4 may be absent). As discussed above, e1-e4 may be provided to any suitable text-to-speech system (not shown) and thereafter provided to a user via loudspeaker 40 of audio transceiver 26. Further, e1-e4 may be looped back (e.g., feedback) and may be an input during a training mode (e.g., d1-d4 may mirror e1-e4).

Figure 5:
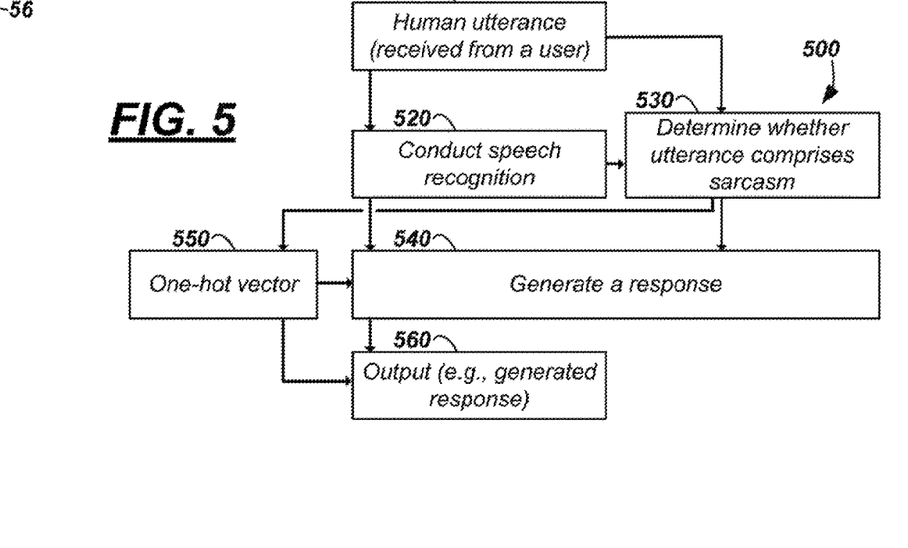
FIG. 5 is a schematic diagram illustrating an example process flow of generating a response using the neural network of FIG. 2.

FIG. 5 illustrates a schematic diagram illustrating an example process flow 500 of generating a response using the neural network 14 of FIGS. 2-4. More particularly, the illustrated example shows that a human utterance may be received from a user (e.g., via audio transceiver 26)—block 510. The utterance of block 510 may be provided to blocks 520 and 530. In block 520, the dialog system 10 may conduct speech recognition (e.g., using speech recognition model 16); the output of the speech recognition model 16 may be provided to both block 530 and block 540. In block 530, the signal knowledge extraction model 18 may determine whether sarcasm information exists in the human utterance (e.g., using the human utterance of block 510 and/or the recognized speech of block 520); this process will be described in greater detail below. When sarcasm information is determined, then it may be provided to blocks 540 and 550. In block 550, a first dimension of a one-hot vector may be assigned a one (1) when sarcasm information is determined in the human utterance of block 510, and the first dimension of the one-hot vector may be assigned a zero (0) when no sarcasm information is determined in the human utterance of block 510. Further, additional dimensions of the one-hot vector, if they exist, may be provided to the neural network 14 in block 540 and/or the output in block 560. In block 540, the neural network 14 may generate a response based on the recognized speech (from block 520), based on the sarcasm determination (block 530), and based on the one-hot vector (block 550). The generated response may be provided from block 540 to block 560. And in block 560, the response may be converted, via software, from text to speech and emitted via loudspeaker 40. In some examples, block 550 may provide a one (1) or a zero (0)—according to a second dimension of the one-hot vector—to block 560 to induce sarcasm in the response. For example, as sarcasm is often conveyed by stating the opposite of what is literally spoken, the second dimension may alter the output—e.g., from "I like tennis" with a sarcasm token to "I don't like tennis" without the sarcasm token, or alternatively, from "I don't like tennis" without the sarcasm token to "I like tennis" with the sarcasm token.

Figure 6A:
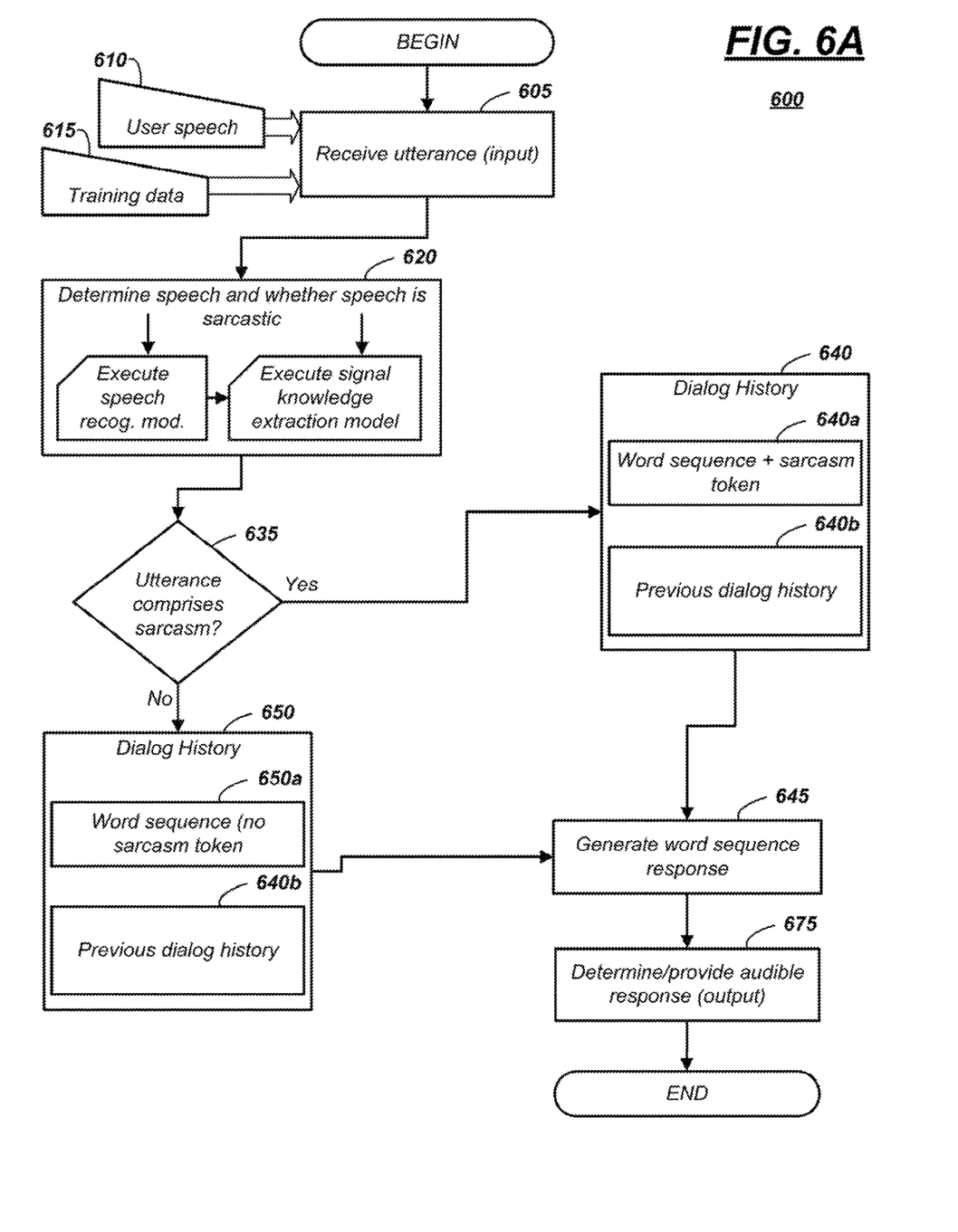
FIG. 6A is a flowchart illustrating an embodiment of providing audible human speech to the dialog system and receiving a response that accounts for sarcasm.

Turning now to FIG. 6A, a process 600 is illustrated describing a technique for providing a computer-generated response that is sensitive to sarcasm in a human utterance. Process 600 is illustrated with a plurality of instructional blocks which may be executed by the one or more processors 30 of dialog system 10. The process may begin with block 605.

In block 605, processor(s) 30 may receive an utterance (e.g., as input to the dialog system 10). The utterance may be a human utterance, and it may be received via user speech (block 610; via audio transceiver 26) or via training data (block 615; stored in memory 34 or 36).

Figure 6B:
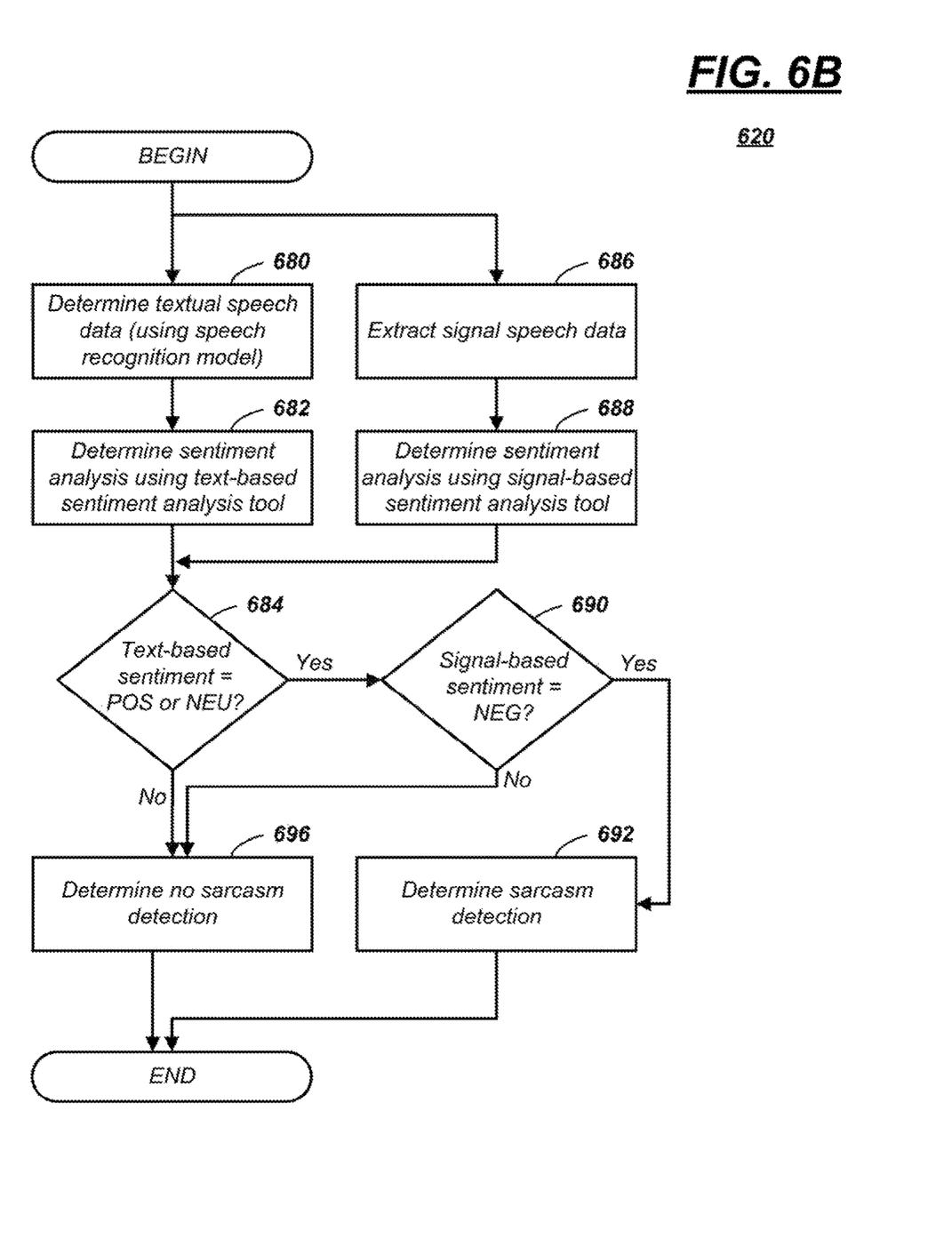
FIG. 6B is a flowchart illustrating an embodiment of determining whether an utterance comprises sarcasm.

Block 620 may follow block 605. And block 620 may be illustrated as a detailed process as shown in FIG. 6B. More particularly, FIG. 6B illustrates an example of how the speech recognition model 16 and the signal knowledge extraction model 18 may be used to determine (e.g., detect) whether the audible human speech comprises sarcasm information.

The process of FIG. 6B may begin with block 680 and block 686. In block 680, the speech recognition model 16 may determine textual speech data based on the audible human speech received in block 605. For example, speech recognition model 16 may determine a sequence of words representative of the user's speech.

In block 682 which may follow block 680, text-based sentiment analysis tool 18a may receive the sequence of words and determine a sentiment value regarding the textual speech data. It will be appreciated that outputs of the text-based sentiment analysis tool 18a may be categorized by degree (e.g., three degrees, such as: positive, negative, or neutral). Once the sentiment value is determined in block 682, the process may proceed to block 684.

In block 684, processor(s) 30 may determine whether the sentiment value of the textual speech data is 'Positive' (POS) or 'Neutral' (NEU). If the textual speech data is determined to be 'Positive' or 'Neutral,' then the process proceeds to block 690. Else (e.g., if it is 'Negative'), the process proceeds to block 696.

In at least one example, block 686 occurs at least partially concurrently with block 680. In block 686, processor(s) 30 may extract signal speech data from the audible human speech received in block 605. As discussed above, the signal speech data may be indicative of acoustic characteristics which include pitch and harmonicity information corresponding to the speech utterance. E.g., pitch and harmonicity information may include a difference in a mean/deviation value of pitch between the current speech utterance and those utterances said by the same speaker in a non-emotional way in the database, a difference in the mean/deviation value of harmonicity between the current speech utterance and those utterances said by the same speaker in a non-emotional way in the database, and/or the like. A non-emotional way may refer to the neutral attitude that a person may use to express a statement without any particular emotion (i.e., happiness, sadness, anger, disgust, or fear).

In block 688 which may follow block 686, signal-based sentiment analysis tool 18b may receive signal speech data comprising analog and/or digital data and determine a sentiment value regarding the signal speech data. It will be appreciated that outputs of the signal-based sentiment analysis tool 18b also may be categorized by degree (e.g., three degrees, such as: positive, negative, or neutral). Once the sentiment value of the instant signal speech data is determined, the process may proceed to block 684 (previously described above).

In block 690 which may follow block 684, processor(s) 30 determine whether the sentiment value from the signal-based sentiment analysis tool 18b is 'Negative.' If the respective sentiment value is 'Negative,' then the process proceeds to block 692. Else (e.g., if the respective sentiment value of the signal-based sentiment analysis tool 18b is 'Positive' or 'Neutral'), the process proceeds to block 696.

In block 692, processor(s) 30 determine sarcasm detection—e.g., that the audible human speech comprises sarcasm expressed by the user-based on both the textual-based and the signal-based sentiment values of the output of the speech recognition model 16 and the signal knowledge extraction model 18, respectively. This detection may refer to the processor(s) 30 determining that sarcasm is more likely than a (predetermined or determined) threshold to comprise sarcasm. Following block 692, the process may end (e.g., continue at block 635, FIG. 6A).

In block 696 (which may follow block 684 or block 690), processor(s) 30 determine that no sarcasm has been detected—e.g., that the audible human speech does not comprise sarcasm expressed by the user. This detection may refer to the processor(s) 30 determining that sarcasm is less likely than a predetermined threshold or a determined threshold to comprise sarcasm. Following block 696, the process may end (e.g., continue at block 635, FIG. 6A).

In block 635, processor(s) 30 cause the process 600 to proceed to block 640 (when the utterance is determined to comprise sarcasm information) or to block 650 (when the utterance is determined not to comprise sarcasm information).

In block 640 (which comprises blocks 640a and 640b), processor(s) 30 append a sarcasm embedding vector to the most recent speech data input of the dialog history 54 before it enters the neural network 14. For example, block 640a comprises appending the sarcasm embedding vector (a.k.a., the embedding vector assigned to a sarcasm token) to the sequence of word embedding vectors assigned to the word sequence generated by the speech recognition model 16 (in block 625). Block 640b is representative of the previous dialog history that is desirable as input to the neural network 14 (some of the word sequences of this previous dialog history may have a respective sarcasm token (previously assigned) and some may not). To illustrate, consider again FIG. 2, wherein two other word sequences in the dialog history 54 are also fed into the neural network 14. FIG. 2 illustrates two word sequences; this is an example; other quantities may be used instead. Following block 640, process 600 may proceed to block 645.

In block 650 (which comprises blocks 650a and 640b), processor(s) 30 do not append a sarcasm embedding vector to the most recent speech data input of the dialog history 54 before it enters the neural network 14. For example, block 650a comprises the sequence of word embedding vectors that represents the word sequence generated by the speech recognition model 16 (absent any sarcasm token). As described above, block 640b is representative of the previous dialog history. Following block 650, process 600 may proceed to block 645.

In block 645, the neural network 14 determines (e.g., generates) a speech data response (e.g., a word sequence response) based on the one-hot vector, based on the output of the speech recognition model 16, and based on the output of the signal knowledge extraction model 18. A speech data response may be a word sequence (which may include a sarcasm token to indicate that the sentence should be expressed in a sarcastic way) that conveys a meaningful response to the human utterance as outputted by the neural network 14; speech data response may require additional processing before providing as an audible response to the user. Following block 645, the process 600 may proceed to block 675.

In block 675, processor(s) 30 determine (e.g., generates), based on the speech data response, an audible response, and this audible response is provided to the user via the audio transceiver 26. Thus, block 675 may comprise configuring the speech data response into an intelligible sentence with sarcasm (if the sarcasm token was added) or without sarcasm (if the sarcasm token was not added). Thereafter, process 600 may end; in other instances, the dialog may continue, and process 600 may loop back to block 605.

Figure 7:
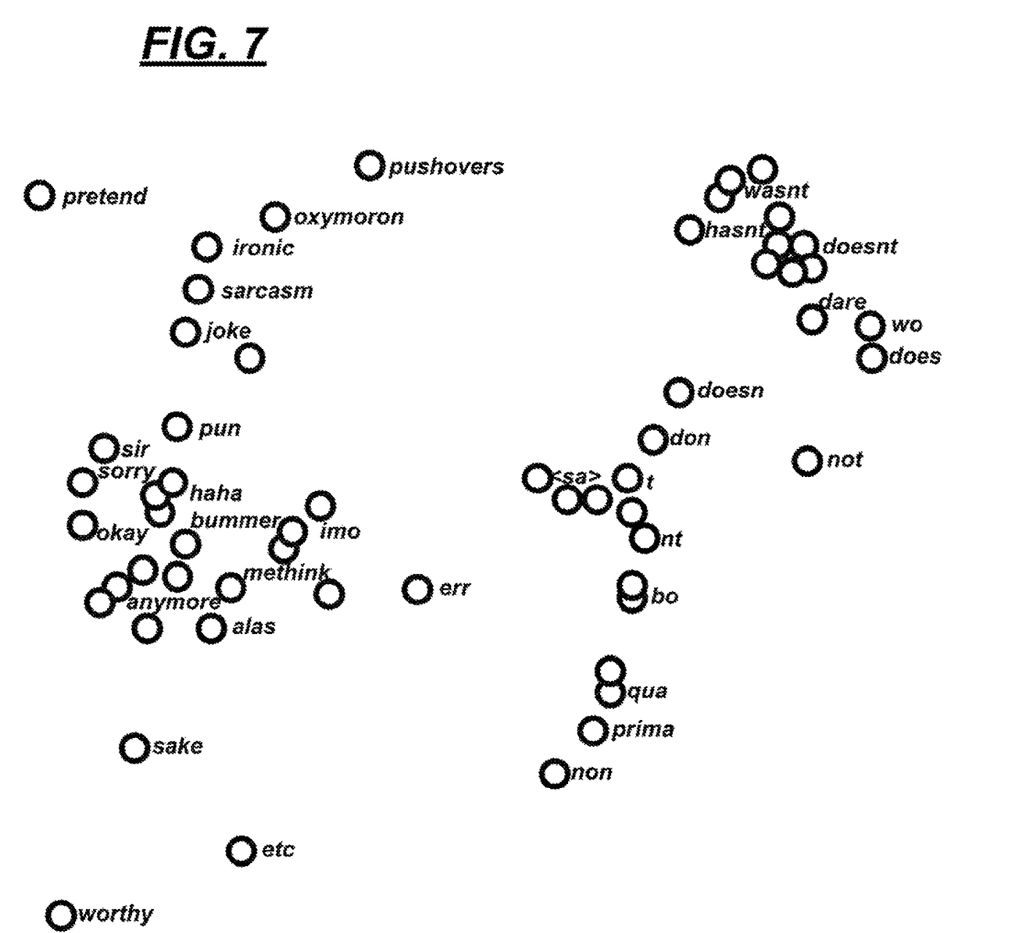
FIG. 7 is a schematic diagram of a semantic space compressed to a two-dimensional space to demonstrate a closeness of an embedding vector to word embedding vectors such as "doesn't," don't," etc.

FIG. 7 is intended to illustrate a multi-dimensional semantic space of word embedding vectors. For example, this semantic space could comprise hundreds of dimensions; in this case, FIG. 7 represents hundreds of such dimensions compressed into a two-dimensional representation. Accordingly, it demonstrates that the sarcasm embedding vector (e.g., the embedding vector learned for the sarcasm token "<sa>"), after training the neural network 14, is closer to those word embedding vectors representing negative words (e.g., such as "don," "t," "nt," "doesn," "not," etc.) in the semantic space of word embeddings. Accordingly, this empirical evidence further suggests that use of sarcasm embedding vector (appended to word sequence), as well as use of one-hot vector, train the dialog system 10 to associate sarcasm information with the negative semantic meaning, thereby improving the quality of generated responses when sarcasm is present in the human utterance.

Figure 8:
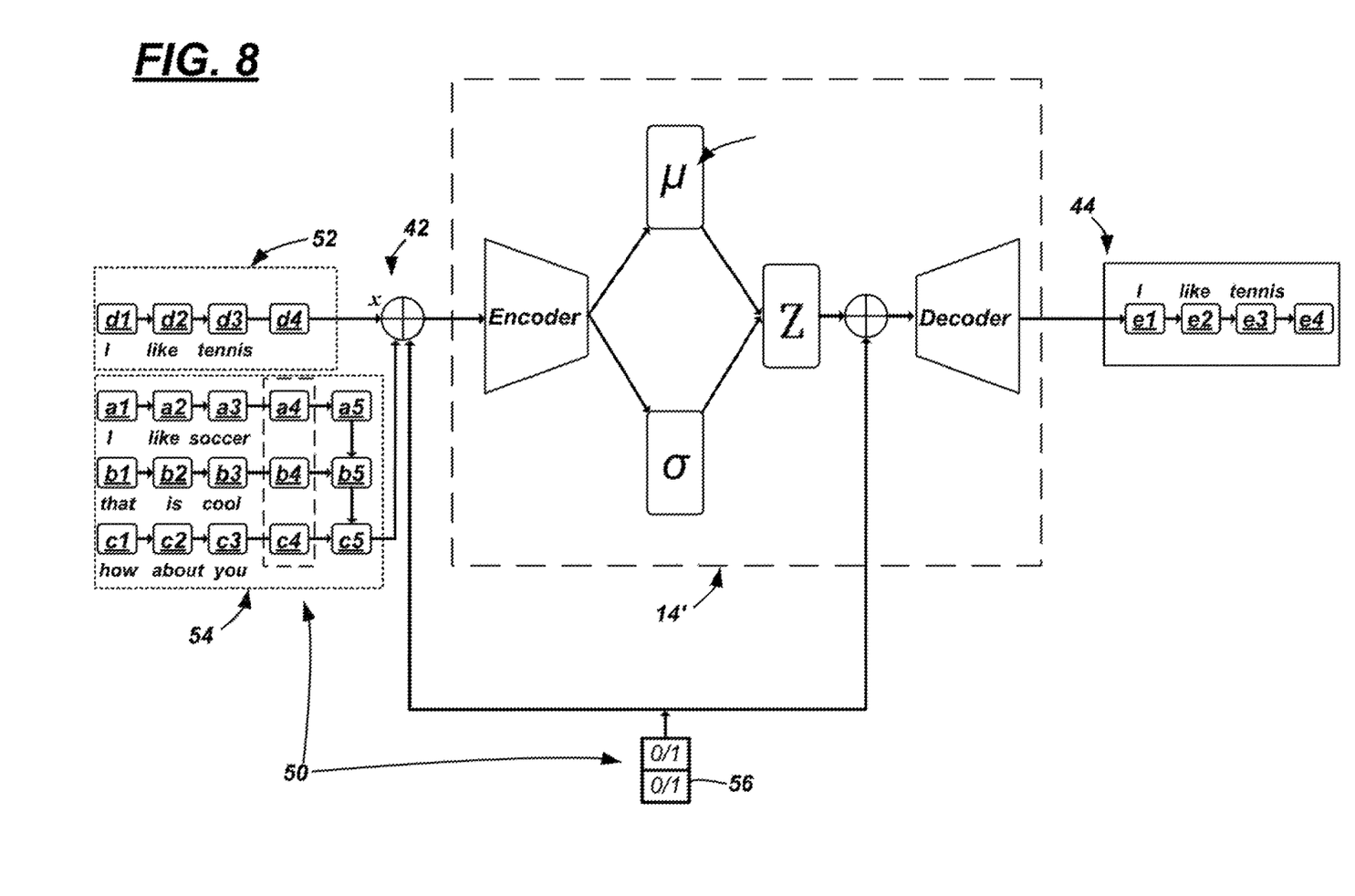
FIG. 8 is a schematic diagram illustrating another example of a neural network that may be used by the dialog system.

Other embodiments also exist. For example, in FIG. 8, a neural network 14' is shown having a similar input 42 (e.g., including dialog history 54 and one-hot vector 56) and a similar output 44. Here, another type of end-to-end neural network is used—e.g., a conditional variational autoencoder (CVAE) 14'. Both neural networks 14 and 14' are merely examples. Still other neural network types may be used in other embodiments.

Still other embodiments are possible as well. For example, in the examples above, dialog system 10 was embodied in the table-top device 12 (having housing 20). FIGS. 9-12 illustrate a few additional, non-limiting examples.

Figure 9:
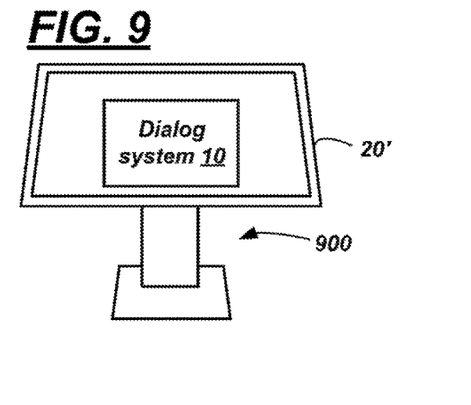
FIG. 9 is a schematic diagram illustrating that the dialog system may be embodied in a kiosk.

In FIG. 9, dialog system 10 may be embodied within an interactive kiosk 900 having a housing 20'. Aspects of the dialog system 10 and its operation may be similar to the description provided above. Non-limiting examples of the kiosk 1000 include any fixed or moving human-machine interface—e.g., including those for residential, commercial, and/or industrial use. A user may approach the kiosk 900, have a dialog exchange wherein some of the user's speech includes sarcasm information, and the kiosk (using dialog system 10) may not only generate and provide a response to the user but may also account for the user's sarcasm. Further, as discussed above, the kiosk 900 could also generate a sarcastic response which may improve the user experience.

Figure 10:
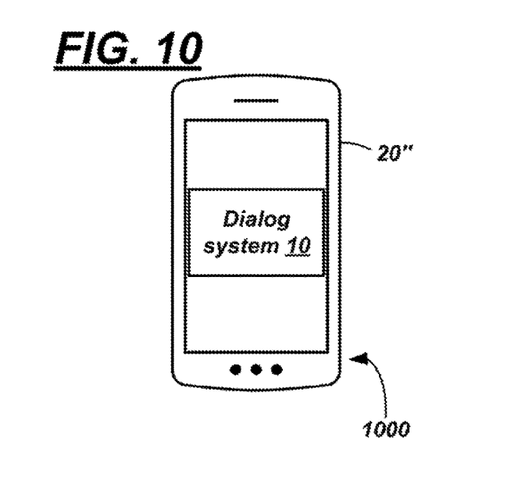
FIG. 10 is a schematic diagram illustrating that the dialog system may be embodied in a mobile device.

In FIG. 10, dialog system 10 may be embodied within a mobile device 1000 having a housing 20". Aspects of the dialog system 10 and its operation may be similar to the description provided above. Non-limiting examples of mobile devices 1000 include Smart phones, wearable electronic devices, tablet computers, laptop computers, other portable electronic devices, and the like. A user may have a dialog exchange with the mobile device 1000, wherein some of the user's speech includes sarcasm information and mobile device 1000 (using dialog system 10) may not only generate and provide a response to the user but may also account for the user's sarcasm. Further, as discussed above, the mobile device 1000 could also generate a sarcastic response which may improve the user experience.

Figure 11:
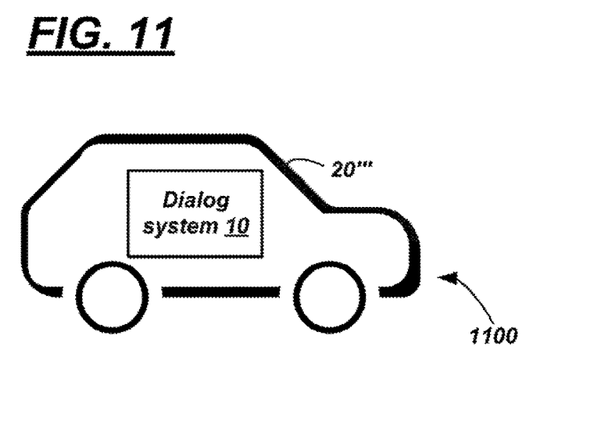
FIG. 11 is a schematic diagram illustrating that the dialog system may be embodied in a vehicle.

In FIG. 11, dialog system 10 may be embodied within a vehicle 1100 having a housing 20'''. Aspects of the dialog system 10 and its operation may be similar to the description provided above. Non-limiting examples of vehicle 1100 include a passenger vehicle, a pickup truck, a heavy-equipment vehicle, a watercraft, an aircraft, or the like. A user may have a dialog exchange with the vehicle 1100, wherein some of the user's speech includes sarcasm information and vehicle 1100 (using dialog system 10) may not only generate and provide a response to the user but may also account for the user's sarcasm. Further, as discussed above, the vehicle 1100 could also generate a sarcastic response which may improve the user experience.

Figure 12:
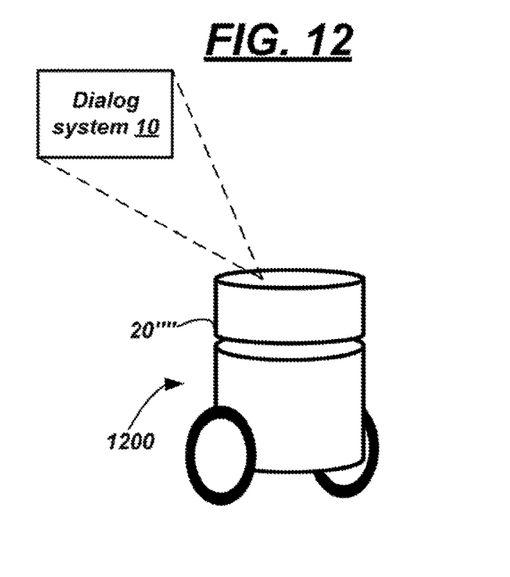
FIG. 12 is a schematic diagram illustrating that the dialog system may be embodied in a robotic machine.

In FIG. 12, dialog system 10 may be embodied within a robotic machine 1200 having a housing 20''''. Aspects of the dialog system 10 and its operation may be similar to the description provided above. Non-limiting examples of robotic machine 1200 include a remotely controlled machine, a partially autonomous, a fully autonomous robotic machine, or the like. A user may have a dialog exchange with the robotic machine 1200, wherein some of the user's speech includes sarcasm information and robotic machine 1200 (using dialog system 10) may not only generate and provide a response to the user but may also account for the user's sarcasm. Further, as discussed above, the robotic machine 1200 could also generate a sarcastic response which may improve the user experience.

Thus, there has been described a sarcasm-sensitive spoken dialog system that interacts with a user by receiving an utterance of the user, processing that utterance, and then generating a response. The dialog system further may detect sarcasm information in the utterance and generate its response according to the sarcasm information. The dialog system may utilize both a sarcasm embedding vector (e.g., also referred to herein as an embedding vector that represents a sarcasm token) and a one-hot vector to improve the modeling of sarcasm information for the response generation procedure. Further, in some examples, using the one-hot vector, the dialog system may offer the user a sarcastic response as well.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method, comprising:
   receiving audible human speech from a user;
   determining that the audible human speech comprises sarcasm information;
   providing an input to a neural network, wherein the input comprises speech data input associated with the audible human speech, an embedding vector associated with the sarcasm information, and a one-hot vector; and
   based on the input, determining an audible response to the human speech.

2. The method of claim 1, wherein the embedding vector associated with the sarcasm information is appended to the speech data input, wherein the speech data input comprises a word embedding layer which comprises a plurality of word embedding vectors.

3. The method of claim 1, wherein the one-hot vector comprises a first dimension, wherein the audible response is determined based on a value of the first dimension.

4. The method of claim 3, wherein the one-hot vector comprises a second dimension, wherein the audible response comprises sarcasm information determined based on a value of the second dimension.

5. The method of claim 3, wherein the one-hot vector comprises a third dimension, wherein the audible response is determined based on a value of the third dimension, wherein the third dimension is associated with a previous utterance of the user.

6. The method of claim 1, wherein the input further comprises a dialog history that comprises at least one additional speech data input.

7. The method of claim 1, wherein the speech input data comprises a word sequence determined using a speech recognition model.

8. The method of claim 1, wherein a signal knowledge extraction model provides the embedding vector and the one-hot vector based on a determination of sarcasm information in the audible human speech and based on a word sequence received from a speech recognition model.

9. The method of claim 1, wherein determining that the audible human speech comprises sarcasm information, comprises:
   determining textual speech data and signal speech data from the audible human speech;
   determining that a text-based sentiment is Positive or Neutral by processing the textual speech data using a text-based sentiment analysis tool;
   determining that a signal-based sentiment is Negative by processing the signal speech data using a signal-based sentiment analysis tool; and
   detecting sarcasm based on the text-based sentiment being Positive or Neutral while the signal-based sentiment is Negative.

10. The method of claim 1, wherein a sarcasm-sensitive spoken dialog system comprises the neural network, wherein the sarcasm-sensitive spoken dialog system is embodied in one of: a table-top device, a kiosk, a mobile device, a vehicle, or a robotic machine.

11. A non-transitory computer-readable medium comprising a plurality of computer-executable instructions and memory for maintaining the plurality of computer-executable instructions, the plurality of computer-executable instructions, when executed by one or more processors of a computer, perform the following functions:
   receive audible human speech from a user;
   determine that the audible human speech comprises sarcasm information;
   provide an input to a neural network, wherein the input comprises speech data input associated with the audible human speech, an embedding vector associated with the sarcasm information, and a one-hot vector; and
   based on the input, determine an audible response to the human speech.

12. The non-transitory computer-readable medium of claim 11, wherein the embedding vector associated with the sarcasm information is appended to the speech data input, wherein the speech data input comprises a word embedding layer which comprises a plurality of word embedding vectors.

13. The non-transitory computer-readable medium of claim 11, wherein the one-hot vector comprises a first dimension, wherein the audible response is determined based on a value of the first dimension.

14. The non-transitory computer-readable medium of claim 11, wherein a signal knowledge extraction model provides the embedding vector and the one-hot vector based on a determination of sarcasm information in the audible human speech and based on a word sequence received from a speech recognition model.

15. A sarcasm-sensitive spoken dialog system, comprising: one or more processors; and memory coupled to the one or more processors, wherein the memory stores a plurality of instructions executable by the one or more processors, the plurality of instructions comprising, to:
  receive audible human speech from a user;
  determine that the audible human speech comprises sarcasm information;
  provide an input to a neural network, wherein the input comprises speech data input associated with the audible human speech, an embedding vector associated with the sarcasm information, and a one-hot vector; and
  based on the input, determine a response to the human speech.

16. The system of claim 15, wherein the embedding vector associated with the sarcasm information is appended to the speech data input, wherein the speech data input comprises a word embedding layer which comprises a plurality of word embedding vectors.

17. The system of claim 15, wherein the one-hot vector comprises a first dimension, wherein the audible response is determined based on a value of the first dimension.

18. The system of claim 17, wherein the one-hot vector comprises a second dimension, wherein the audible response comprises sarcasm information determined based on a value of the second dimension.

19. The system of claim 15, wherein a signal knowledge extraction model provides the embedding vector and the one-hot vector based on a determination of sarcasm information in the audible human speech and based on a word sequence received from a speech recognition model.

20. A table-top device, a kiosk, a mobile device, a vehicle, or a robotic machine comprising the sarcasm-sensitive spoken dialog system of claim 15.

* * * * *